Nov. 17, 1964

T. WALTERS 3,157,293

PACKAGE HANDLING MACHINE

Filed Sept. 13, 1962

INVENTOR.
TOM WALTERS

BY Richard S. Shreve, Jr

ATTORNEY

Nov. 17, 1964  T. WALTERS  3,157,293
PACKAGE HANDLING MACHINE
Filed Sept. 13, 1962  4 Sheets-Sheet 3

INVENTOR.
TOM WALTERS
BY Richard S. Shreve, Jr.
ATTORNEY

United States Patent Office 3,157,293
Patented Nov. 17, 1964

3,157,293
PACKAGE HANDLING MACHINE
Tom Walters, Point Pleasant, W. Va., assignor to Union
Carbide Corporation, a corporation of New York
Filed Sept. 13, 1962, Ser. No. 223,467
8 Claims. (Cl. 214—1)

This invention relates to package handling machines and more particularly to such machines for turning bags or packages about axes after they are filled and closed, to facilitate delivery thereof.

The need for compact bag handling equipment arrived with the advent of the pasted valve type bag. The packing machine presently used to fill this type bag discharges the filled bag automatically in such a manner that the bag lands upon the bag handling equipment on its edge. It is desirable and economical to label or print the identification of the bag's contents on one end and one face of the bag. Upon palleting (or stacking) the filled bags, the end printing should be on one face of the stack and the face printing always should be face up. The bag handling equipment must perform this function by turning the discharged filled bag from its edge position 90° over flat— then 90° or more, as desired, around so that the end printing is leading on the conveyors and the printed face is up.

The main object of the present invention is to provide a package handling machine to flop the filled bag over flat and also turn it endways 90° or as desired and convey said bag to an adjacent conveying system, bag flattener or the like.

Other objects are to accomplish this flopping and rotating in any direction desirable in a space of 3'0"± diameter, thus eliminating space consuming conveyor arrangements previously required to accomplish these phases of bag handling, and to permit installations to the most favorable advantages in regards to supporting steel, bag handling and conveyor arrangements that eliminate one or more conveyors at each packer installation.

According to the present invention, the package handling machine comprises a collapsible roller bed table which rotates and pitches downward towards an adjacent conveyor.

The apparatus can be spring loaded and/or counter-weighted so that the weight of a filled bag operates the movement automatically.

The movement also can be accomplished with a power unit such as a hydraulic rotary power unit. This unit can be actuated initially by the weight of the filled bag upon the roller bed, flopping over to trip the controls that actuate the rotating cycle. This cycle consists of rotating the bag 90°± clockwise or opposite as desired, discharging the bag at the extreme of the downward pitch of the roller bed, then reversing rotation, returning the apparatus into position to receive the next bag and subsequent cycle action.

One aspect of my invention consists of a hinged table, spring loaded or counterweighted to pitch the top face of the table approximately 28° from the horizontal. When a weighted article is placed upon the table, the weight will overload the springs, causing the table to swing to the horizontal stop position. The article and table, following least resistance will flop over, thus accomplishing a 90° rotation of the article from its original orientation.

A second aspect of my invention is a fixed pitched shaft with helical grooves hubbed as a bearing with the hub supporting a table on a horizontal hinge that will, upon rotation, cause the table and article to be positioned at an angle of 20° more or less, discharging the bag.

A third novel feature is the design of a torque bearing that reduces torque forces in a helical designed bearing permitting practical applications, especially where the forces of cantilever loads are involved.

A fourth aspect of my invention is a pitched shaft and bearing assembly supporting a table horizontally that will, upon rotation, cause the table and bag to be positioned at an angle of 20° more or less, discharging the bag.

A fifth feature is the design of a bearing assembly with a practical application of having upon the assembly, radial forces, cantilever forces, and thrust forces in either direction along the axis of the assembly (or shaft) without transmitting these forces to a gear drive or the like.

Figure 1:
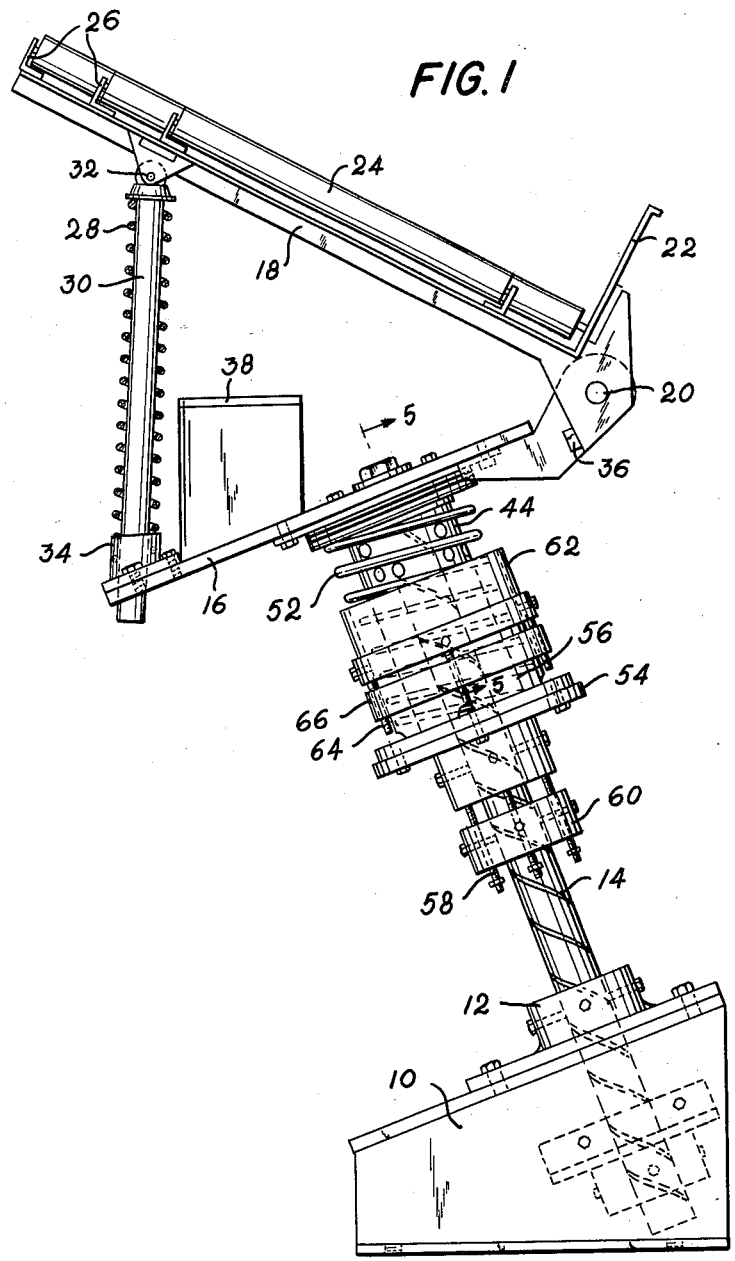
FIG. 1 is an elevation of a packaging machine according to the preferred embodiment of the present invention.

In the form shown in FIG. 1, the machine comprises a base 10 having a boss 12 in which is secured a shaft 14 inclined at an acute angle to the vertical, and secured in height adjusted position. A base plate 16 perpendicular to the inclined shaft 14, is mounted for rotation about the axis thereof.

Pivoted to the upper edge of the base plate 16 is a bed table 18, by a hinge 20 secured therebetween. The bed table 18 has a package receiving flange 22 in which are journaled rolls 24 on axes perpendicular to the flange. The other ends of the rolls 24 are journaled in angle slips 26.

The bed table 18 is urged to a receiving position at an acute angle to the horizontal plane through the hinge 20, by a coil compression spring 28 surrounding a spring guide 30 pivoted at 32 to the bottom of the bed table 18 and slidable through a bearing sleeve 34 secured near the lower edge of the base plate 16.

A stop 36 on the hinge 20 limits the rise of the bed table 18 to about 28° above the horizontal, and a stop 38 on the base plate 16 limits the descent of the bed table 18 to substantially horizontal position.

Figure 2:
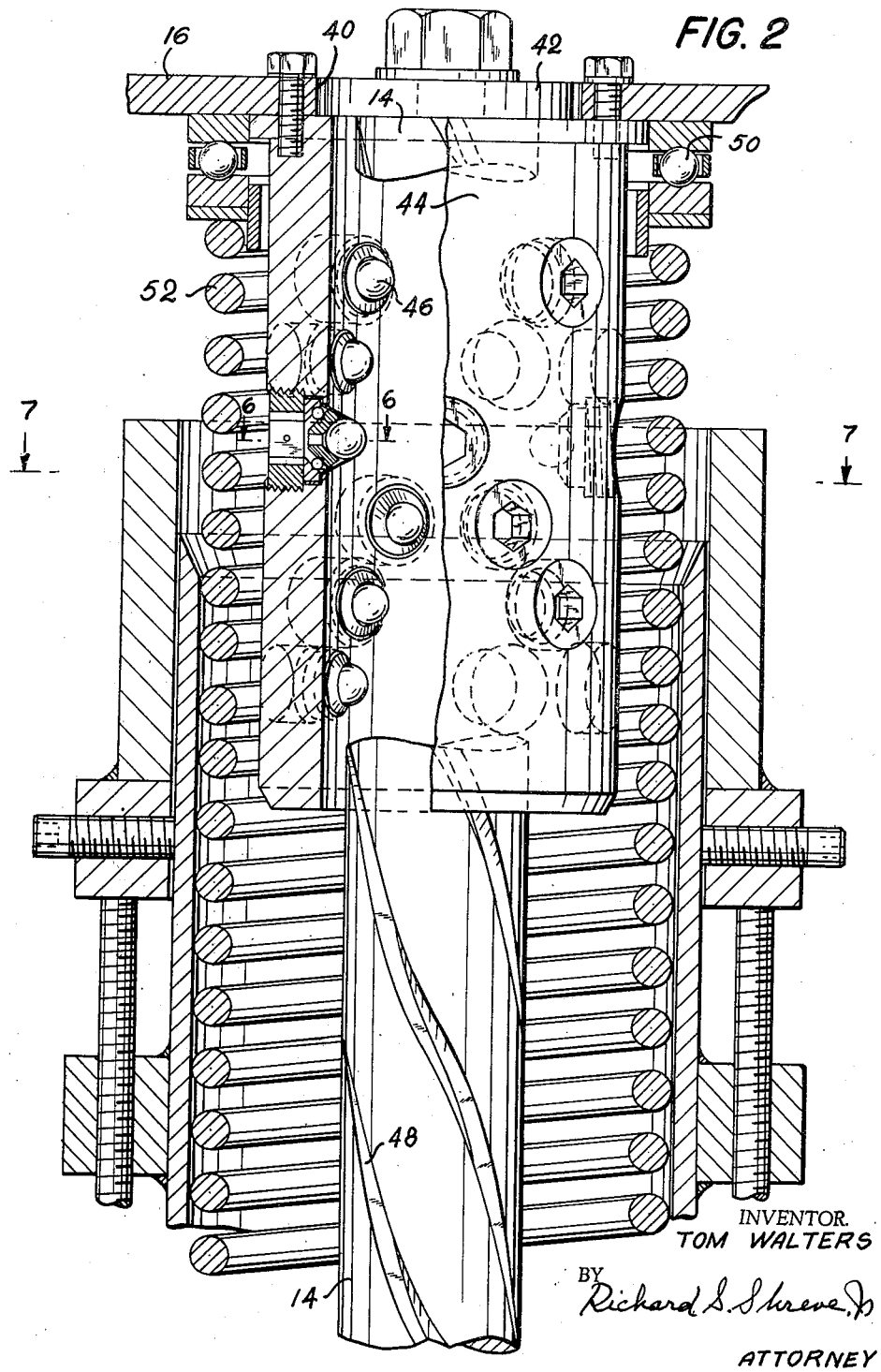
FIG. 2 is an enlarged vertical cross section through the rotating mechanism of FIG. 1.

As shown in FIG. 2, the base plate 16 has a central aperture 40 through which passes an end disc 42 bolted to the upper end of the shaft 14. Outside of this aperture, the bottom of the base plate 16 is bolted to the top of a sleeve 44 concentric with and outside of the shaft 14. This sleeve has internal followers engaging a cam formed by a helical groove 48 in the inclined shaft 14. Outside of the sleeve 44 and adjacent to the bottom of the base plate 16 is the upper race of torque bearings 50, the lower race of which is secured to and supported by the upper end of a coil compression spring 52.

As shown in FIG. 1, the bottom of this spring 52 rests upon a supporting flange 54 adjustably secured on the inclined shaft 14.

Mounted on top of the flange 54 is a shroud 56 for the spring 52 outside of and concentric therewith. For adjusting the compression of the spring 52, the flange 54 is slidable along the shaft 14 by jack screws 58 in a collar 60 received on the shaft below the flange.

Surrounding the top of the shroud 56 is a stop ring 62, which limits the descent of the base plate 16, and therefore limits the angle of rotation of the bed plate about the inclined shaft 14. The stop ring 62 is vertically adjustable by jack screws 64 in a collar 66 secured to the outside of the shroud 56.

Figure 3:
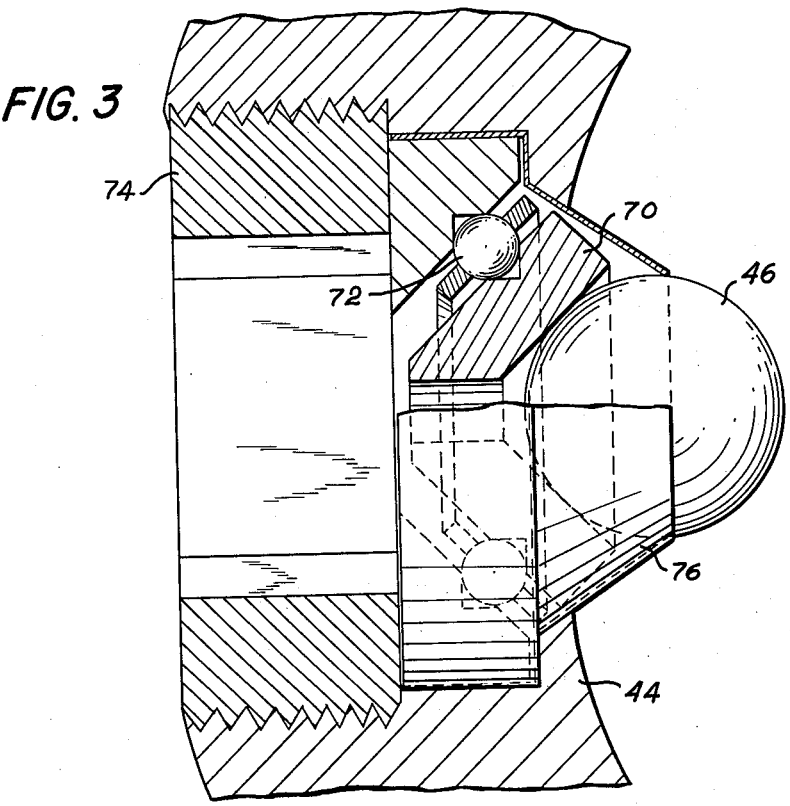
FIG. 3 is an enlarged cross section through the anti-friction follower shown in FIG. 2.
Figure 4:
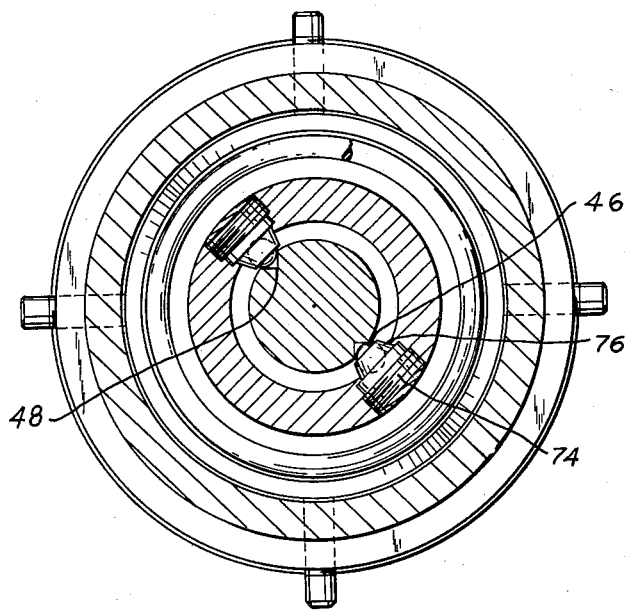
FIG. 4 is an internal elevation of the follower shown in FIG. 3.

As shown in FIG. 3, each follower 46 in the sleeve 44 comprises a sphere journaled in a conical seat 70 which forms the upper race of ball bearings 72, the lower grooved race of which is held in a socket on the sleeve 44 by a screw plug 74, which clamps a conical shield 76 for the sphere 46 in the socket under the lower race of the ball bearing 72.

In operation of the form shown in FIG. 1, when a package is deposited on the bed table 18, resting on the rollers 24 and against the flange 22, the weight of the package overcomes the spring 28, and causes the bed table 18 to descend, reversing about the hinge 20. The spring guide 30 slides down through the bearing 34 until the bed table 18 reaches the stop 38.

The weight of the package is transmitted by the bed table 18 through the hinge 20 and spring 28 and ultimately stop 38 to the base plate 16, and sleeve 44 bolted thereto, causing them both to descend along the inclined shaft 14.

The followers 46 engaging the cam tracks 48 in the inclined shaft 14 cause the sleeve 44 and base plate 16 to rotate about the axis of the inclined shaft 14, carrying the once horizontal bed table 18 through an angle of about 90°. The base plate 16 being perpendicular to the shaft axis and the once horizontal bed table being at an angle thereto, such rotation causes the once horizontal bed table 18 to swing at an increasing angle downward during the rotation. The centrifugal force due to the rotation is in a direction perpendicular to the axis of the rollers 24, and along the downward angle, to propel the package away from the axis of rotation. The downward inclination causes gravity assistance to the centrifugal force to discharge the package onto the delivery system.

Figure 5:
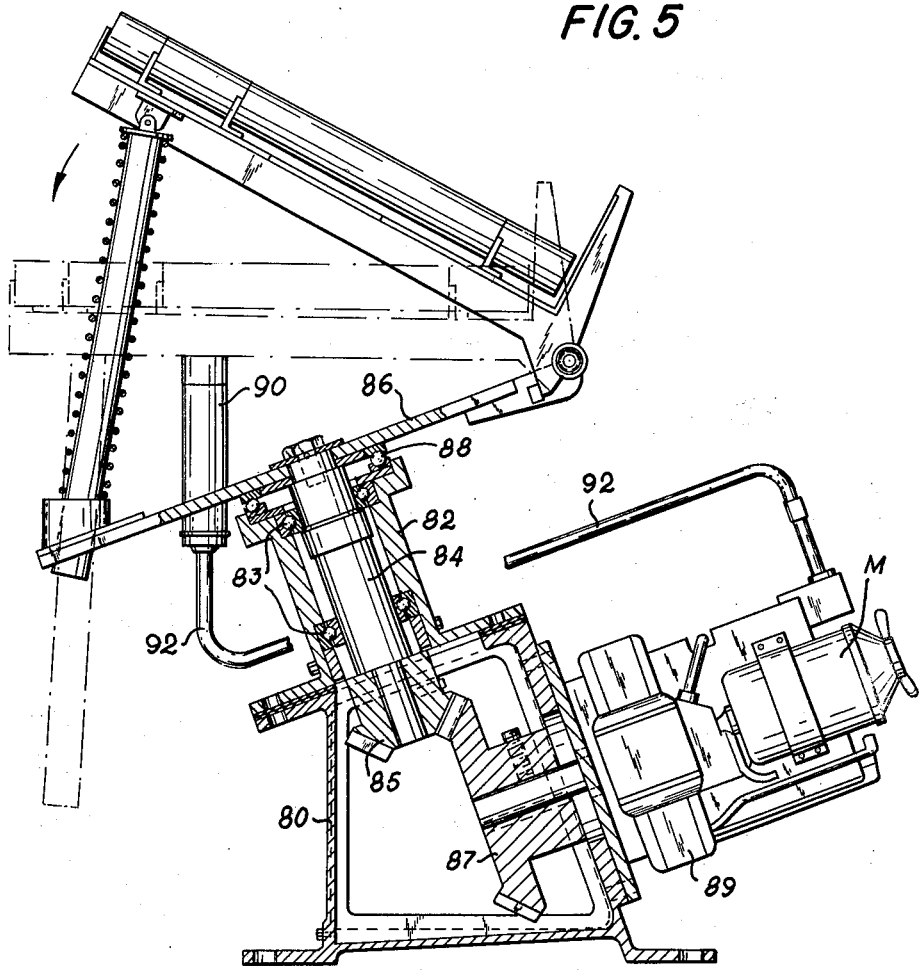
FIG. 5 is a view similar to FIG. 1, showing a modification.

In the form shown in FIG. 5, the base 80 has a boss 82 having bearings 83 in which is journaled a shaft 84 inclined at an acute angle to the vertical. Secured to the bottom of the shaft 84 is a bevel pinion 85 meshing with a bevel gear 87 keyed on the shaft of hydraulic transmission 89 driven by electric motor M.

A base plate 86 is bolted directly onto the top of the inclined shaft 84 and rests on bearings 88 in races between the bottom of plate 86 and the top of boss 82. Mounted on the base plate 86 is an actuator trap 90 connected by a conduit 92 to the transmission 89.

The bed table 18 and other parts carried by the base 86 are substantially the same as those carried by the base plate 16, and need not be redescribed in detail.

In operation of the form shown in FIG. 5 the descent of the bed table is the same as hereinbefore described, until it reaches the trap 90. The trap 90 causes the transmission 89 to positively drive the shaft 84 through gear 87 and pinion 85. Positive drive of the base plate 86 causes the same centrifugal force and gravity action as described with respect to FIG. 1.

The hydraulic transmission motor drive can be set to transmit rotation of 45° in one second more or less. The gear ratio of the bevel gears is 2:1, transmitting to the table 90° rotation in one second. A one second pause in the actuating system of the power unit allows for the discharge of the bag. The power unit then reverses the rotation in one second to the standby position. Thus, there is a three second more or less cycle or 20 bags per minute capacity.

What is claimed is:

1. In a package handling machine, a shaft inclined at an acute angle to the vertical, a base plate perpendicular to said shaft and mounted for rotation about the axis thereof, a bed table normally at an acute angle above said base plate, a hinge connecting said bed table to said base plate, said bed table descending about said hinge under the weight of a package thereon into substantially horizontal position to move the package about a substantially horizontal axis, and means actuated by the descent of said bed table for turning said base plate and bed table thereon about the axis of said inclined shaft into delivery position inclined downwardly from the horizontal.

2. In a package handling machine as claimed in claim 1, in which said base plate is rigidly secured to the top of said shaft, and said means actuated by the descent of said bed table is a trip controlled motor drive for said inclined shaft.

3. In a package handling machine a shaft inclined at an acute angle to the vertical, a base plate perpendicular to said shaft and mounted for rotation about the axis thereof, a bed table, a hinge connecting said bed table to said base plate, means normally urging said bed table upward about said hinge to an acute angle above said base plate, said bed table descending about said hinge into substantially horizontal position when the weight of a package on said bed table overcomes said bed table urging means to turn the package about a substantially horizontal axis, and means actuated by the descent of said bed table for turning said base plate with said bed table thereon about the axis of said inclined shaft into delivery position inclined downwardly from the horizontal.

4. In a machine as claimed in claim 3 in which said base plate is rigidly secured to the top of said inclined shaft.

5. In a package handling machine, a shaft inclined at an acute angle to the vertical, a base plate perpendicular to said shaft and mounted for rotation about the axis thereof, means on said base plate for receiving a package, and means actuated by the weight of said package for turning said base plate about the axis of said inclined shaft in combination with a bed table, a substantially horizontal hinge connecting said bed table and said base plate, means normally urging said bed table upward about said hinge to an acute angle above said base plate, said bed table descending about said hinge when the weight of a package on said bed table overcomes said urging means to turn the package about a substantially horizontal axis.

6. Package handling machine as claimed in claim 5, in which said bed table is provided with a retaining flange parallel to said hinge, and a series of parallel rolls journaled in said flange on axis transverse to said hinge.

7. In a package handling machine, a shaft inclined at an acute angle to the vertical, a base plate mounted for sliding movement along said shaft and for rotation about the axis thereof, means normally urging said base plate upward along said shaft, a bed table, a substantially horizontal hinge connecting said bed table and said base plate, means normally urging said bed table upward about said hinge to an acute angle above said base plate, said bed table descending about said hinge when the weight of a package on said bed table overcomes said bed table urging means to turn the package about a substantially horizontal axis, and cooperating means on said base plate and inclined shaft actuated by the weight of said package acting on said base plate overcoming said base plate urging means for turning the package about the axis of said inclined shaft.

8. Package handling machine as claimed in claim 7, in which said urging means comprise helically coiled compression springs.

References Cited in the file of this patent

UNITED STATES PATENTS

| | | |
|---|---|---|
| 1,115,707 | Marcus | Nov. 3, 1914 |
| 1,736,419 | Smith | Nov. 19, 1929 |
| 1,826,107 | Von der Horst | Oct. 6, 1931 |
| 1,906,126 | Mott | Apr. 25, 1933 |
| 2,238,764 | Wolf | Apr. 15, 1941 |
| 2,711,655 | Schottler | June 28, 1955 |
| 2,758,725 | Collyer | Aug. 14, 1956 |
| 2,835,395 | Curtenius | May 20, 1958 |
| 2,986,261 | Wenstrand | May 30, 1961 |
| 3,035,715 | Laing et al. | May 22, 1962 |
| 3,090,476 | Sanders | May 21, 1963 |
| 3,099,168 | Martens | July 30, 1963 |